(12) United States Patent
Koeten et al.

(10) Patent No.: US 10,142,378 B2
(45) Date of Patent: Nov. 27, 2018

(54) VIRTUAL IDENTITY OF A USER BASED ON DISPARATE IDENTITY SERVICES

(71) Applicant: Symantec Corporation, Mountain View, CA (US)

(72) Inventors: Robert Koeten, Menlo Park, CA (US); Jeff L. Lowe, Sunnyvale, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 176 days.

(21) Appl. No.: 14/168,659

(22) Filed: Jan. 30, 2014

(65) Prior Publication Data

US 2015/0215348 A1    Jul. 30, 2015

(51) Int. Cl.
*H04L 29/06* (2006.01)

(52) U.S. Cl.
CPC ...... *H04L 65/1073* (2013.01); *H04L 63/0815* (2013.01); *H04L 63/102* (2013.01); *H04L 63/104* (2013.01)

(58) Field of Classification Search
CPC . H04L 65/1073; H04L 63/0815; H04L 63/08; H04L 67/02; H04L 63/102; H04L 63/0823; H04L 63/10; H04L 69/329; H04L 63/0853; H04L 2463/081; H04L 2463/061; H04L 63/061; H04L 63/068; H04L 63/0807; H04L 63/101; H04L 63/20; H04L 9/3271; H04L 63/0209; H04L 63/205; H04L 12/2856; H04L 2209/04; H04L 2209/80; H04L 29/12122; H04L 61/1547; H04L 63/0281; H04L 63/0421; H04L 63/0884; H04L 63/105; H04L 63/126; H04L 9/0816; H04L 9/32; H04L 9/3213; H04L 61/2596; H04L 61/301; H04L 63/0442; H04L 63/083; H04L 63/0892; H04L 63/1466; H04L 63/162;
(Continued)

(56) References Cited

U.S. PATENT DOCUMENTS

| | | |
|---|---|---|
| 5,864,868 A | 1/1999 | Contois |
| D567,251 S | 4/2008 | Sadler |

(Continued)

FOREIGN PATENT DOCUMENTS

WO    2012171081 A1    12/2012

OTHER PUBLICATIONS

International Search Report and Written Opinion for PCT/US2015/013584 dated Apr. 15, 2015.

*Primary Examiner* — Greg C Bengzon
(74) *Attorney, Agent, or Firm* — Maschoff Brennan

(57) ABSTRACT

A virtual identity and context module may generate a virtual identity for a user. Virtual identities for different categories of users may be sourced from disparate identity services. For example, a first authentication of the user provided by a first identity service may be identified. A first virtual attribute field of the virtual identity may be populated or filled based on a first attribute field associated with the first identity service. A second identity service associated with the user may also be identified. A second virtual attribute field of the virtual identity may be populated or filled based on a second attribute field associated with the second identity service. Access to an application may be provided to a user based on the virtual attribute fields of the virtual identity that has been generated for the user.

11 Claims, 7 Drawing Sheets

(58) Field of Classification Search
CPC ..... H04L 63/18; H04L 65/1069; H04L 67/28;
H04L 67/30; H04L 9/3013; H04L 9/321;
H04L 9/3257; H04L 12/4633; H04L
2209/42; H04L 2209/56; H04L 2209/805;
H04L 2463/082; H04L 47/70; H04L
63/0838; H04L 63/0846; H04L 63/104;
H04L 63/168; H04L 67/306; H04L
67/327; H04L 9/3226; H04L 9/3228;
G06F 21/6236; G06F 17/30864; G06F
21/34; G06F 21/604; G06F 2221/2115;
G06F 17/3064; G06F 21/10; G06F 21/35;
G06F 21/602; G06F 2221/2141; G06F
17/30873; G06F 21/6254; G06F 21/6263;
G06F 21/79; G06F 2221/2149; H04W
12/06; H04W 12/04; H04W 88/02; H04W
84/12; H04W 12/02; H04W 74/00; H04W
8/26; H04W 36/0038; H04W 88/08
See application file for complete search history.

(56) References Cited

U.S. PATENT DOCUMENTS

| | | | |
|---|---|---|---|
| 7,509,672 B1* | 3/2009 | Horwitz | G06F 21/41 726/8 |
| D634,749 S | 3/2011 | Brown | |
| D640,265 S | 6/2011 | Brouwers et al. | |
| D658,667 S | 5/2012 | Cho et al. | |
| D667,835 S | 9/2012 | Chaudhri | |
| 8,276,197 B1* | 9/2012 | Mangal | H04L 65/1016 726/8 |
| D670,726 S | 11/2012 | Bitran et al. | |
| D688,685 S | 8/2013 | Rhee et al. | |
| D689,512 S | 9/2013 | Pearcy et al. | |
| 8,544,069 B1* | 9/2013 | Subbiah | H04L 63/0884 340/5.8 |
| D691,626 S | 10/2013 | Philopoulos | |
| 8,566,917 B2* | 10/2013 | Vangpat | H04L 63/0815 726/8 |
| D696,681 S | 12/2013 | Kim et al. | |
| D696,684 S | 12/2013 | Yuk et al. | |
| D696,689 S | 12/2013 | Lee et al. | |
| D699,260 S | 2/2014 | Lindmark et al. | |
| D705,245 S | 5/2014 | Coffman et al. | |
| 8,782,766 B1* | 7/2014 | Metke | G06F 21/41 726/7 |
| 8,832,271 B2* | 9/2014 | McCarty | H04L 63/0823 709/225 |
| 8,856,957 B1* | 10/2014 | Roth | G06F 1/26 713/155 |
| 8,898,147 B2* | 11/2014 | Seitz | G06F 9/5016 707/719 |
| 8,938,684 B2 | 1/2015 | Guertler et al. | |
| 8,947,374 B2 | 2/2015 | Flam et al. | |
| 8,990,734 B2 | 3/2015 | Woycik et al. | |
| D727,342 S | 4/2015 | Omiya | |
| D731,531 S | 6/2015 | Park et al. | |
| 9,330,134 B2* | 5/2016 | Long | G06F 17/30386 |
| 9,628,471 B1* | 4/2017 | Sundaram | H04L 63/083 |
| 2003/0229783 A1* | 12/2003 | Hardt | G06F 21/33 713/155 |
| 2004/0133561 A1* | 7/2004 | Burke | G06Q 10/107 |
| 2006/0123472 A1* | 6/2006 | Schmidt | G06F 21/41 726/8 |
| 2007/0083514 A1* | 4/2007 | Dettinger | G06F 17/3053 |
| 2007/0157124 A1 | 7/2007 | Haug | |
| 2007/0220268 A1* | 9/2007 | Krishnaprasad | G06F 17/30427 713/182 |
| 2008/0072301 A1* | 3/2008 | Chia | H04L 63/0815 726/8 |
| 2008/0168539 A1* | 7/2008 | Stein | H04L 63/0815 726/5 |
| 2009/0164248 A1 | 6/2009 | Hunt et al. | |
| 2010/0017740 A1 | 1/2010 | Gonzalez Veron et al. | |
| 2010/0024015 A1* | 1/2010 | Hardt | H04L 67/14 726/6 |
| 2010/0057512 A1 | 3/2010 | Tays et al. | |
| 2010/0114984 A1* | 5/2010 | Short | G06F 21/6245 707/803 |
| 2010/0146611 A1* | 6/2010 | Kuzin | H04L 63/0815 726/8 |
| 2010/0223572 A1 | 9/2010 | Upadhyaya et al. | |
| 2010/0274815 A1* | 10/2010 | Vanasco | G06F 17/30867 707/798 |
| 2011/0145099 A1 | 6/2011 | Berger | |
| 2011/0162034 A1* | 6/2011 | Nagaratnam | G06F 21/604 726/1 |
| 2011/0202986 A1* | 8/2011 | Horn | H04L 63/0815 726/7 |
| 2011/0231919 A1* | 9/2011 | Vangpat | H04L 63/0815 726/8 |
| 2012/0023565 A1* | 1/2012 | Tumanyan | G06F 21/41 726/8 |
| 2012/0062840 A1 | 3/2012 | Ballou, Jr. et al. | |
| 2012/0204248 A1* | 8/2012 | Gonzalez | H04L 63/105 726/8 |
| 2012/0209735 A1* | 8/2012 | Subramanian | H04L 9/321 705/26.1 |
| 2012/0216267 A1* | 8/2012 | Austel | H04L 9/3234 726/8 |
| 2012/0311663 A1* | 12/2012 | Seidl | G06F 21/41 726/1 |
| 2012/0323717 A1* | 12/2012 | Kirsch | G06Q 20/0855 705/26.1 |
| 2013/0074167 A1* | 3/2013 | Bailey | G06F 21/41 726/6 |
| 2013/0111573 A1* | 5/2013 | Mani | H04L 63/0815 726/8 |
| 2013/0160105 A1* | 6/2013 | Huang | G06F 21/41 726/8 |
| 2013/0179824 A1 | 7/2013 | Lazzaro et al. | |
| 2013/0238621 A1* | 9/2013 | Ganjam | G06F 17/30864 707/737 |
| 2013/0263237 A1 | 10/2013 | Kumaraswamy | |
| 2013/0269017 A1* | 10/2013 | Patil | G06F 21/41 726/8 |
| 2013/0298215 A1* | 11/2013 | Kuznetsov | H04L 9/3263 726/8 |
| 2013/0305317 A1* | 11/2013 | Umamaheswaran | H04L 63/0815 726/4 |
| 2014/0013409 A1* | 1/2014 | Halageri | H04L 63/0815 726/8 |
| 2014/0025796 A1 | 1/2014 | Vibhor et al. | |
| 2014/0066044 A1* | 3/2014 | Ramnani | H04W 8/24 455/418 |
| 2014/0114907 A1* | 4/2014 | Kozina | G06F 17/30592 707/602 |
| 2014/0149942 A1 | 5/2014 | Wood-Salomon | |
| 2014/0207813 A1* | 7/2014 | Long | G06F 17/30386 707/758 |
| 2014/0208408 A1* | 7/2014 | Bilgen | H04L 63/0815 726/8 |
| 2014/0289829 A1* | 9/2014 | Xu | H04L 9/3263 726/6 |
| 2015/0193605 A1* | 7/2015 | Li | G06F 21/105 726/27 |
| 2015/0310196 A1* | 10/2015 | Turgeman | G06F 21/552 726/19 |
| 2015/0332029 A1* | 11/2015 | Coxe | H04L 63/0815 726/9 |
| 2015/0347742 A1* | 12/2015 | Huang | G06F 21/41 726/8 |
| 2016/0219114 A1* | 7/2016 | Keyani | H04L 67/20 |
| 2016/0308852 A1* | 10/2016 | Coxe | H04L 63/0815 |
| 2017/0277775 A1* | 9/2017 | Eigner | G06F 21/60 |

* cited by examiner

VIRTUAL IDENTITY OF A USER BASED ON DISPARATE IDENTITY SERVICES

TECHNICAL FIELD

The present disclosure relates to a virtual identity, and more particularly, a virtual identity of a user based on disparate identity services.

BACKGROUND

A cloud-based single sign-on (SSO) system provides access to multiple independent software or network systems. For example, with a cloud-based SSO system, a user may log in at the cloud-based SSO system and gain access to the multiple but independent software or network systems without being prompted to continuously log in at subsequent times at each of the software or network systems.

The cloud-based SSO system may manage multiple identity services that each provide a type of authentication service or mechanism and/or are a source of information associated with authenticated users. For example, an identity service may provide an authentication service as well as attributes of users who have been authenticated by the authentication service. Once a user has been authenticated, the cloud-based SSO system may allow or authorize access to the software or network applications based on the user being authenticated against an identity service as well as information associated with the user provided by the identity service. For example, a user may be authorized to access an application based on a user attribute of the user that is stored at an identity service.

Policies may be assigned to the software or network applications based on the attributes of the users and/or the attributes may be transmitted to the software or network application. For example, an administrator of the cloud-based SSO system may define a policy that allows access to an application if a user attribute matches a condition of the policy.

Thus, the administrator of the cloud-based SSO may be required to identify specific attributes of users from identity services for defining a policy. However, the identity services may store attributes of the users in different formats (e.g., different attribute names). Such disparate attribute information stored at different identity services may make the assigning of attributes to a policy or the transmitting of such attributes to applications complex and difficult.

BRIEF DESCRIPTION OF THE DRAWINGS

The present disclosure will be understood more fully from the detailed description given below and from the accompanying drawings of various implementations of the disclosure.

SUMMARY

Figure 1:
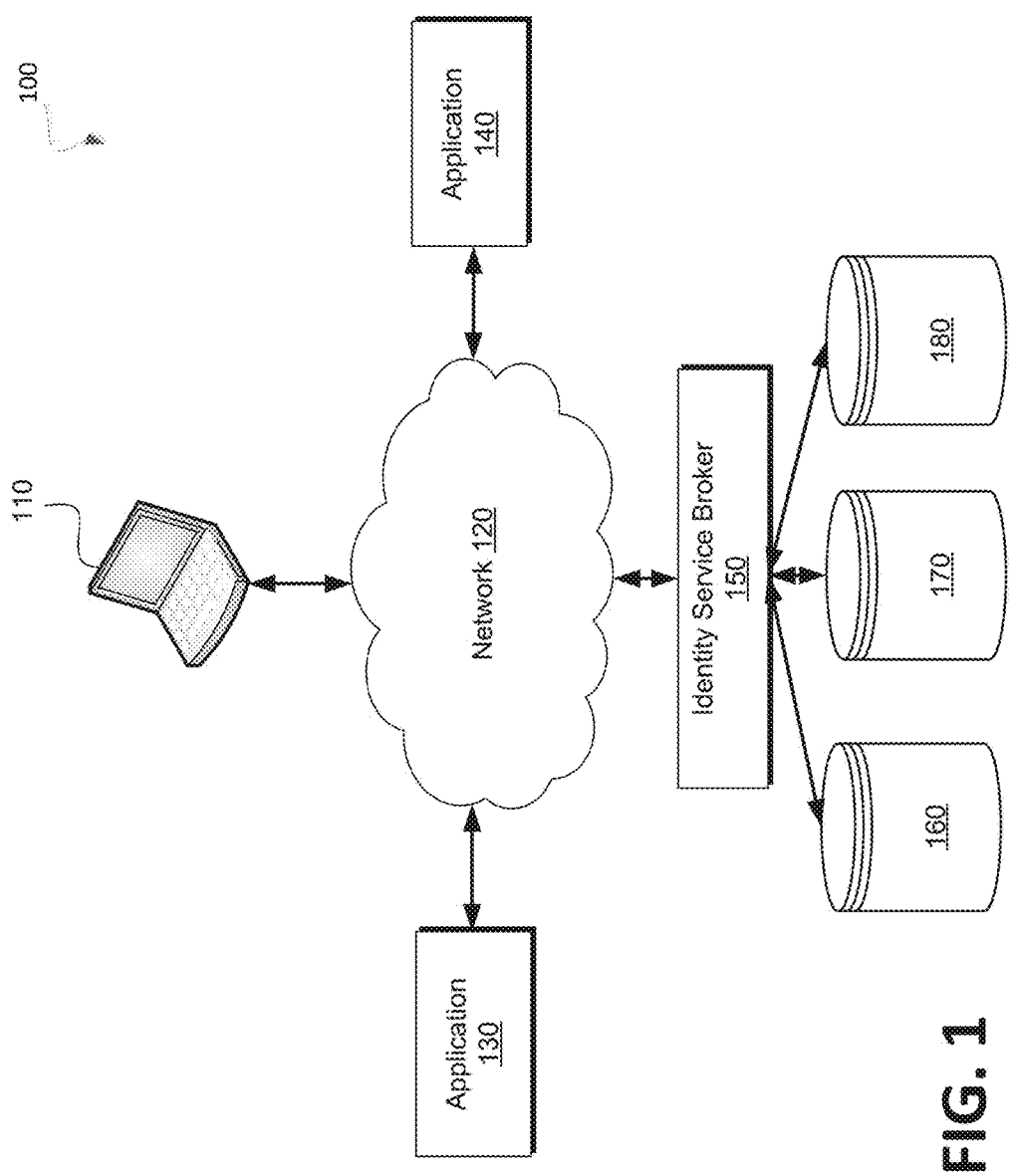
FIG. 1 illustrates an example system architecture in accordance with various implementations.

A first authentication of a user associated with a first identity service may be identified. A virtual identity of the user including a plurality of virtual attribute fields may be generated. A first virtual attribute field of the plurality of virtual attribute fields may be generated based on a first attribute associated with the user at the first identity service. A second identity service associated with the user may be further identified. A second virtual attribute field of the plurality of the virtual attribute fields may be populated based on a second attribute associated with the user at the second identity service. Access to the application by the user may be allowed based on the virtual attribute fields of the virtual identity.

In some embodiments, a policy may be defined based on values of the plurality of virtual attribute fields of the virtual identity and the allowing of the access for the user to the application may be further based on the policy.

In some embodiments, the allowing of the access for the user to the application may further be based on the policy such that the first virtual attribute field or the second virtual attribute field of the plurality of virtual attribute fields of the virtual identity of the user matches a condition of the policy associated with the first or second virtual attribute field.

In some embodiments, after the populating of the first virtual attribute field based on a first attribute associated with the user at the first identity service, it may be determined that at least one virtual attribute field of the plurality of virtual attribute fields is not assigned a value. The identifying of the second identity service associated with the user and the populating of the second virtual attribute field based on the second attribute associated with the user at the second identity service may be performed in response to the determining that at least one virtual attribute field of the plurality of virtual attribute fields is not assigned a value.

In some embodiments, a link may be identified between the first attribute field at the first identity service and the second attribute field at the second identity service and the second attribute field associated with the user at the second identity service may be identified based on the link.

In some embodiments, the first authentication may be a primary authentication performed against the first identity service and the second identity service may be a different type of identity service than the first identity service. Furthermore, the link may be a federated identity of the user.

In some embodiments, a value of at least one of the virtual attribute fields of the plurality of virtual attribute fields may be transmitted to the application that has been accessed by the user.

DETAILED DESCRIPTION

Described herein is a method and apparatus for creating a virtual identity for a user based on disparate or multiple identity services. Authentication may refer to verification that an entity or a user is who the entity or user claims to be by using a type of source of an authentication mechanism (e.g., an identity service). For example, a user may log in to a centralized authentication server that provides a single sign-on access control mechanism to multiple independent software or network systems by utilizing multiple types or sources of authentication mechanisms. The types or sources of authentication mechanisms may also be referred to as identity services. Accordingly, the centralized authentication server may be referred to as an identity service broker as it may manage multiple identity services.

Once a user has logged in to the identity service broker (e.g., through the SSO access control), the user may also be authenticated through or against identity services that are managed by the identity service broker. In some embodiments, the identity services may be categorized or grouped into a type or role of an identity service. For example, the identity services may be categorized as, but not limited to, a primary authentication service, a secondary authentication service, or a supplemental attribute service.

The identity services may be associated with a single role or multiple roles. For example, an identity service may only provide an authentication service or may only provide a supplemental attribute service that provides information (e.g., attributes) of users. In some embodiments, an identity service may provide both an authentication service as well as a supplemental attribute service.

In some embodiments, the identity service broker may also provide access control (e.g., authorization) to software or network applications. An administrator of the identity service broker may specify a policy to be assigned to each of the software or network applications that must be met in order for a user to access the software or network applications. For example, the administrator may specify or define the policy based on attributes of a user that are also provided by the identity services. Such attributes may also be referred to as supplemental attributes. Furthermore, the identity service broker may transmit attributes of the user that are provided by identity services to the software or network application that the user is seeking to access. In some embodiments, the attributes may be transmitted to the application for purposes of role-based access, entitlements, just in time provisioning, application accounts, identification and mapping, etc.

However, the attributes of the user provided by the identity services may be stored in different formats. For example, an attribute corresponding to a username of a user may be stored in a field 'username' in a first identity service and in a field 'name' in a second identity service. The first identity service may further include an attribute in a field 'email' for the same user and the second identity service may include an attribute in a field 'location' for the same user as well.

Implementations of the present disclosure may include a virtual identity and context module, which is described in further detail below, to identify links or relationships between attribute fields of identity services and to generate a virtual identity based on the attribute fields from the identity services. The use of the virtual identity may result in a set of normalized virtual attribute fields that may be used to define policies for applications. The features of the virtual identity and context module, which are described in further detail below, may include an identity service identifier sub-module, a generator sub-module, a populating sub-module, a link sub-module, a transmitter sub-module, and a session data sub-module.

FIG. 1 illustrates an example system architecture 100 for various implementations. The system architecture 100 may include one or more computing devices 110, an identity service broker 150, and network applications 130 and 140 coupled to each other via a network 120. The network 120 may be a public network, a private network, a wireless network, a cellular network, or a combination thereof.

An identity service broker may be a central authentication server that provides virtual identity generation and authentication for a client of a computing device 110 to applications 130 and 140 that are hosted or provided by independent and separate network or software systems. For example, the identity service broker may be considered to be a cloud-based computing system that manages identity services to access remote network or software systems. A computing device 110 may be a desktop computer, laptop computer, or a portable computing device such as, but not limited to, mobile telephones, personal digital assistants (PDAs), portable media players, netbooks, tablet computers, portable gaming consoles, portable televisions, electronic book readers, and the like. As shown, one or more users may use the computing devices 110 to authenticate with an identity service broker 150 and receive authorization to access the applications 130 and 140.

The identity service broker 150 may authenticate a user based on one or more identity services 160, 170, and 180. For example, the identity service broker 150 may manage different types or sources of authentication mechanisms or authentication information that are provided by the identity services 160, 170, and 180. Examples of authentication mechanisms may include, but are not limited to, a primary authentication, a secondary authentication, and supplemental attributes information. Primary authentication may refer to an authentication based on a user providing a username and password. For example, a user may enter a username and password and the username and password may be matched against an authentication mechanism or source such as an active directory (AD) that may contain a repository of valid combinations of usernames and passwords. In some embodiments, a secondary authentication may refer to an authentication mechanism that must be provided in addition to the primary authentication. For example, a primary authentication may correspond to a username and password and the secondary authentication may correspond to, but is not limited to, a security token, digital certificates such as a Public Key Infrastructure (PKI) certificate, etc. The combination of the primary authentication with the secondary authentication may be referred to as a two factor authentication as two different authentication mechanisms or sources are required for a user to be successfully authenticated. Furthermore, the supplemental attributes information may refer to user attributes of a user. In some embodiments, the user attributes of a user may be stored in a separate identity service or may also be associated or included with an identity service that provides either the primary authentication or the secondary authentication.

As shown in FIG. 1, the identity service broker 150 may manage the identity services 160, 170, and 180. Each of the identity services 160, 170, and 180 may provide a different authentication service. For example, the identity service 160 may be an Active Directory or a Security Assertion Markup Language (SAML) source that provides a primary authentication based on a username and password. In some embodiments, the primary authentication may also be based on a ticket (e.g., a Kerberos-based ticket) that is provided to a user in response to a first log-in by a user. Furthermore, the identity service 170 may provide a secondary authentication mechanism based on a PKI certificate, token, or any other such information. The identity service 180 may provide supplemental attributes that correspond to a user. In some embodiments, the identity services 160 and 170 may also provide supplemental attributes that correspond to the user.

The identity service broker 150 may be associated with and/or store policies associated with the applications 130 and 140. In some embodiments, the policies may include conditions based on the user attributes and may be assigned to the applications 130 and 140. For example, a first policy specifying an attribute value of 'California' for a location attribute corresponding to a user may be assigned to the application 130 and a second policy specifying an attribute value of 'Engineering' for a work organization attribute corresponding to the user may be assigned to the application 140. As discussed in further detail below, the assigning of attributes to the policies may be based on virtual attribute fields of a virtual identity.

As the user of the computing device 110 authenticates with the identity service broker 150 against the identity services 160, 170, and 180, a virtual identity for the user may be generated based on attributes stored at the identity services 160, 170, and 180 that the user has successfully authenticated against. For example, the identity service 160 may include attributes that include a 'location' attribute field and the identity service 170 may include attributes that include a 'work organization' attribute field. The identity service broker 150 may identify a link or relationship between the identity service 160 and the identity service 170 and generate a virtual identity for the user based on the attributes at the identity service 160 and the identity service 170.

The identity service broker 150 may include functionality to define policies, assign the policies to applications, provide a single sign-on access control, retrieve attributes stored at identity services, and a virtual identity and context module to generate a virtual identity including normalized virtual attributes that are based on attributes stored at the identity services 160, 170, and 180. Further details with regard to the identity service broker 150 and a virtual identity and context module are disclosed in further detail below.

Figure 2:
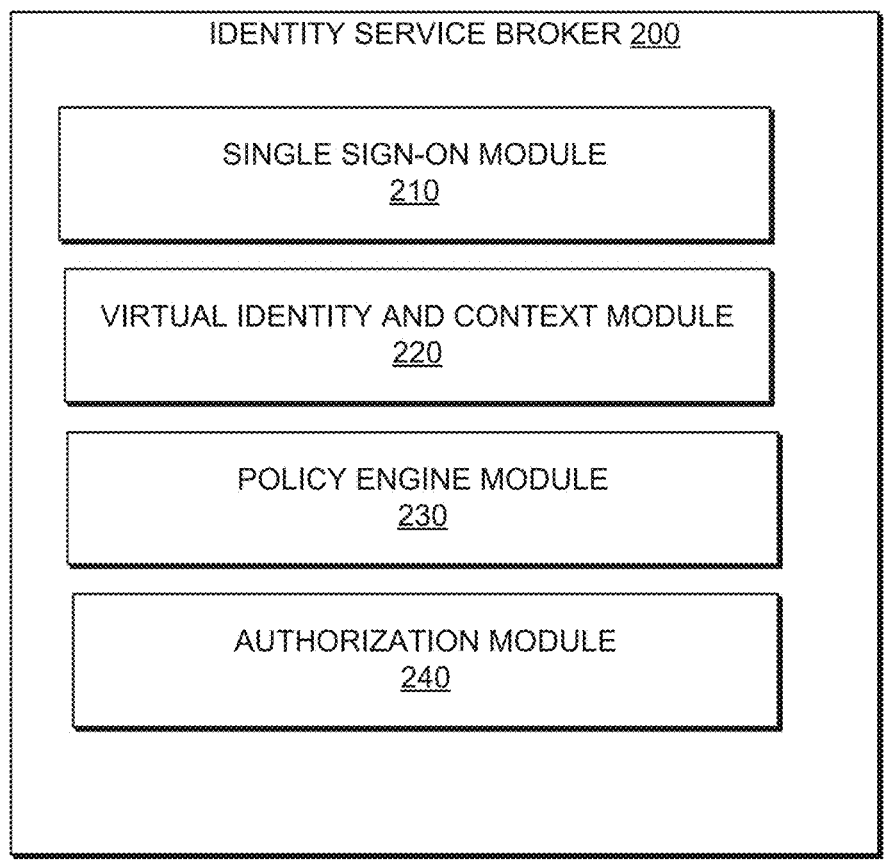
FIG. 2 is a block diagram of an example identity service broker in accordance with some embodiments of the present disclosure.

FIG. 2 is a block diagram of an identity service broker 200 in accordance with some embodiments. In general, the identity service broker 200 may correspond to the identity service broker 150 as shown in FIG. 1. The identity service broker 200 may include a single sign-on (SSO) module 210, a virtual identity and context module 220, a policy engine module 230, and an authorization module 240. In alternative embodiments, the functionality of one or more of the modules may be combined or divided.

As shown in FIG. 2, the identity service broker 200 may include a single sign-on module 210. In some embodiments, the single sign-on module 210 may provide access control for a user to multiple networks or systems. For example, a user may provide a username and password to the single sign-on module 210 and be authenticated based on the username and password matching a valid username and password combination from an Active Directory (AD), SAML source, etc. or provide a Kerberos ticket. In some embodiments, the single-sign on may result in a primary authentication. In the same or alternative embodiments, the single sign-on may also include a secondary authentication. Furthermore, the identity service broker 200 may include a policy engine module 230. In some embodiments, the policy engine module 230 may be used to define or assign attribute values to a policy and to assign the policy to one or more applications. For example, a policy requiring an attribute value of 'Robert' may be assigned to an application and another policy requiring an attribute value of 'Jeff' may be assigned to another application. The policy engine module 230 may specify an attribute from a virtual identity of a user for a policy as is disclosed in further detail below with reference to FIGS. 4-6. The identity services broker 200 may further include an authorization module 240. In some embodiments, the authorization module 240 may allow or authorize access to one or more applications based on a user satisfying a policy assigned to the applications.

The identity services broker 200 may include a virtual identity and context module 220. In some embodiments, the virtual identity and context module 220 may generate a virtual identity for a user who has logged in to the single sign-on module 210 of the identity service broker 200. For example, the virtual identity and context module 220 may populate virtual attribute fields of a virtual identity assigned to the user based on attributes stored at different identity services. Further details with regard to the virtual identity and context module 220 are disclosed in further detail with reference to FIG. 3.

As such, the identity services broker 200 may provide a single sign-on access control for a cloud-based system and/or other independent networks and systems that provide applications or services. The identity services broker 200 may be used to specify attributes for policies and assign the policies to the applications or services. Furthermore, a user may be assigned a virtual identity that includes virtual attribute fields and values from the identity services associated with the user. The identity services broker 200 may authorize a user to access applications if the user's virtual attribute values from the virtual identity meets the conditions of the policy and/or may transmit the virtual attributes from the virtual identity to an accessed application.

Figure 3:
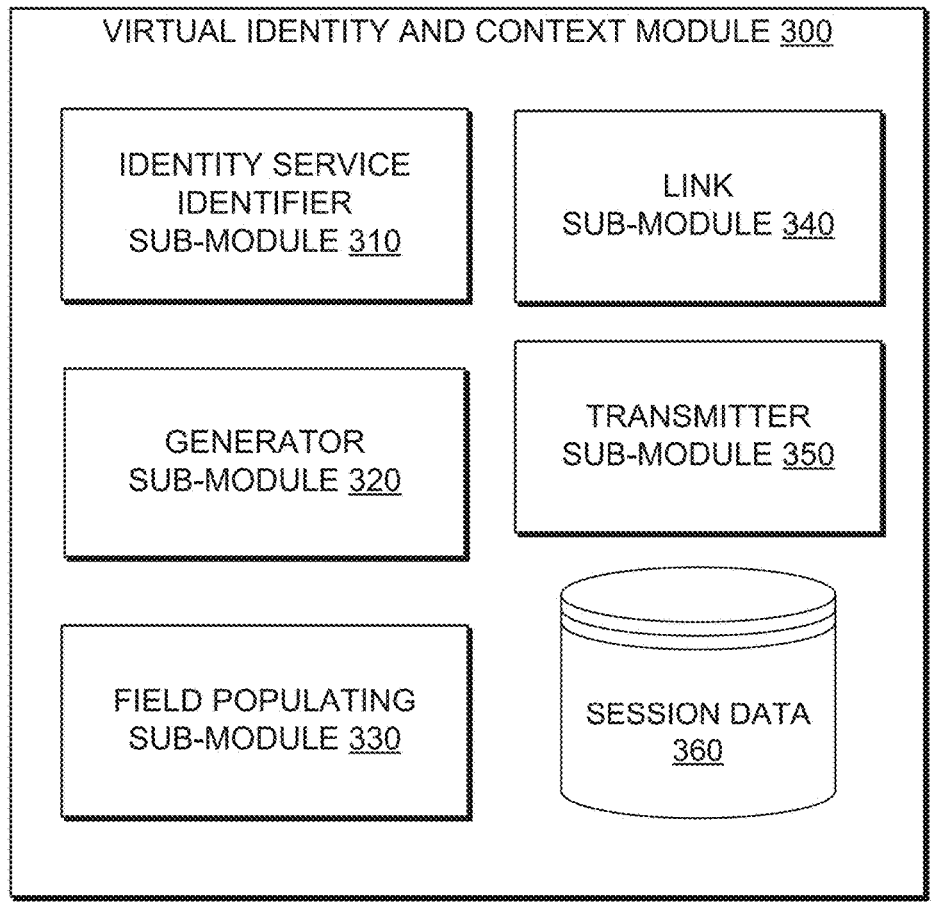
FIG. 3 is a block diagram of an example of a virtual identity and context module in accordance with some embodiments.

FIG. 3 is a block diagram of a virtual identity and context module 300 in accordance with some embodiments. In general, the virtual identity and context module 300 may correspond to the virtual identity and context module 220 in an identity services broker 150 or 200 as shown in FIGS. 1 and 2. The virtual identity and context module 300 may include an identity service identifier sub-module 310, a generator sub-module 320, a field population sub-module 330, a link sub-module 340, a transmitter sub-module 350, and a session data sub-module 360. In alternative embodiments, the functionality of one or more of the sub-modules may be combined or divided.

As shown in FIG. 3, the virtual identity and context module 300 may include an identity service identifier sub-module 310. In some embodiments, an identity service identifier sub-module 310 may identify identity services associated with a user. For example, the identity service identifier sub-module 310 may identify that a user has been successfully verified by an identity service that provides a primary authentication, a secondary authentication, or that the identity service provides attributes of the user. In some embodiments, the identity service identifier sub-module 310 may receive an identification that a user has provided a verified username and password or other such primary authentication information to a single sign-on access control service of an identity service broker. In response to the user authentication, the identity service identifier sub-module 310 may identify one or more identity services associated with the user. In some embodiments, the identity service identifier sub-module 310 may identify identity sources associated with the user that include attributes of the user (e.g., supplemental attributes). The virtual identity and context module 300 may further include a generator sub-module 320. In some embodiments, the generator sub-module 320 may create or generate a virtual identity for the user. In the same or alternative embodiments, the virtual identity may include one or more generated virtual attribute fields based on policies associated with the user and/or policies associated with applications. For example, the generator sub-module 320 may create a virtual attribute field for the virtual identity for each attribute required by policies managed by an identity service broker. As an example, a first policy may specify an attribute for 'name' and 'location' and a second policy may specify an attribute for 'email address.' In response to identifying the attributes specified by the first and second policies, the generator sub-module 320 may create or generate a virtual identity for the user that includes virtual attribute fields corresponding to the attributes of 'name,' location,' and 'email address.' Further detail with regard to attributes are disclosed with relation to FIG. 5.

Returning to FIG. 3, the virtual identity and context module 300 may include a field population sub-module 330. In some embodiments, the field population sub-module 330 may fill or populate virtual attribute fields of the virtual identity with attribute values from one or more identity services. For example, the field population sub-module 330 may populate virtual attribute fields of the virtual identity created by the generator sub-module 320 with attributes stored at identity services that have been identified by the identity service identifier sub-module 310. Furthermore, a link sub-module 340 may identify a link between a first identity service and a second identity service. In response to such a determination, the field population sub-module 330 may populate virtual attribute fields of the virtual identity with attributes from the second identity service based on the identified link. Further details with regard to such a mechanism are disclosed in further detail below.

In some embodiments, the virtual identity and context module 300 may include a session data sub-module 360. The session data sub-module 360 may be a persistent storage unit. In some embodiments, a persistent storage unit may be a local storage unit or a remote storage unit. Persistent storage units may be a magnetic storage unit, optical storage unit, solid state storage unit, electronic storage units (main memory), or similar storage unit. Persistent storage units may be a monolithic device or a distributed set of devices. A 'set', as used herein, refers to any positive whole number of items. In some embodiments, the session data sub-module 360 may store the virtual identity of a user as well as session context information associated with a user.

The virtual identity and context module 300 may further include a transmitter sub-module 350. In some embodiments, the transmitter sub-module 350 may transmit the virtual identity and/or session data information to a policy engine module (e.g., policy engine module 230) or to an application to which a user has been authorized to access.

As such, the virtual identity and context module 300 may identify one or multiple identity services that are associated with a user. In some embodiments, each of the identified identity services may include attribute information of users who have been successfully authenticated against the identity service. The virtual identity and context module 300 may further generate a virtual identity for the user. For example, the virtual identity may include one or more virtual attribute fields that may contain attribute values. In some embodiments, the virtual identity may include a virtual attribute field for each type of attribute that is specified in one or more policies. The virtual identity and context module 300 may further populate or fill the virtual attribute fields of the virtual identity with attribute values from the identity services.

Figure 4:
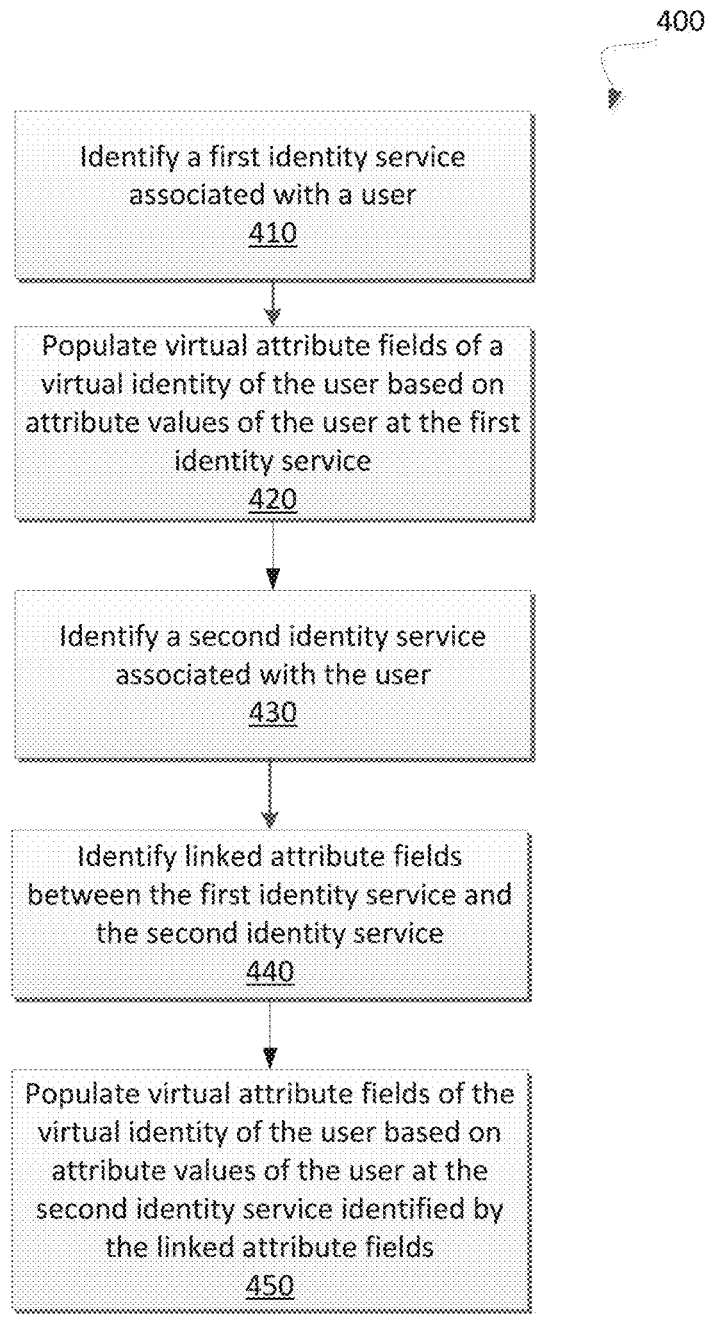
FIG. 4 is a flow diagram illustrating an example method to populate virtual attribute fields of a virtual identity in accordance with some embodiments of the present disclosure.

FIG. 4 is a flow diagram illustrating an example method 400 to populate virtual attribute fields of a virtual identity. The method 400 may be performed by processing logic that may comprise hardware (e.g., a processing device, circuitry, dedicated logic, programmable logic, microcode, etc.), software (e.g., instructions run on a processing device), or a combination thereof. In some embodiments, the method 400 may be performed by a virtual identity and context module 220 or 300 of FIGS. 2 and 3 in an identity service broker 150 or 200 of FIGS. 1 and 2.

As shown in FIG. 4, the method 400 may begin by the processing logic identifying a first identity service associated with a user (block 410). For example, the processing logic may identify that a user has been accessed a single sign-on function of an identity service broker and has been authenticated against a first identity service. In some embodiments, such a first authentication may be referred to as a primary authentication. The processing logic may populate or fill virtual attribute fields of a virtual identity assigned to the user based on attribute values of the user at the first identity service (block 420). For example, the processing logic may retrieve attribute values of the user stored at the first identity service and assign the retrieved attribute values to corresponding virtual attribute fields of the virtual identity. The processing logic may identify a second identity service that is associated with the user (block 430). In some embodiments, the second identity service may be separate and different from the first identity service. For example, the second identity service may provide a secondary authentication and/or may only provide attributes of a user. The processing logic may identify linked attribute fields between the first identity service and the second identity service (block 440). In some embodiments, a linked field may be referred to as a federation identification. For example, a first attribute field stored in the first identity service may be linked with a second attribute field stored in the second identity service. In some embodiments, an administrator of the identity service broker may preconfigure the linking of the two attribute fields between the first identity service and the second identity service. Further details with regard to linked attribute fields are disclosed in further detail below with reference to FIG. 5.

Returning to FIG. 4, the processing logic may further populate the virtual attribute fields of the virtual identity assigned to the user based on attribute values of the user stored at the second identity service that have been identified by the linked attribute fields (block 450). For example, a linked attribute field may be considered a federated identity that links a user's attribute values in the first identity service with the user's attribute values in the second identity service. As such, the linked attribute fields may identify corresponding attributes of a single user across distinct identity services. As an example, an administrator of the identity services broker may specify a linked attribute field named 'Employee-ID' in the first identity service with a linked attribute field named 'Emp. Number' in the second identity service. The processing logic may identify a user's attribute values in a record of the first identity service that includes an attribute value for the 'Employee-ID' field and may search the records in the second identity service for a the same attribute value in the 'Emp. Number' field in the second identity service. If the same attribute value is found in the linked attribute field of the second identity service, then attribute values of the record that includes the attribute value may be used to populate or fill additional virtual attribute fields of the virtual identity.

As such, a first identity service may be identified and virtual attribute fields of a virtual identity may be filled based on attribute values located in the first identity service. A determination may be made if a second identity service is linked to the first identity service based on linked fields in the first and second identity services. Furthermore, in some embodiments, an administrator of the identity service broker may preconfigure a relationship between the first identity service and the second identity service. Additional virtual attribute fields of the virtual identity may then be filled based on attribute values located in the second identity service. In some embodiments, multiple secondary identity services may be linked to create an aggregated virtual identity. For example, a first identity service that provides a primary authentication may be linked to a second identity service and a third identity service. As such, any number and any different type of identity services may be linked based on the linked fields that may be preconfigured by an administrator of the identity service broker. Thus, as an example, a user may successfully authenticate (e.g., a primary authentication) against a first identity service and a linked field from the first identity service may be identified with a linked field of a second identity service. Furthermore, the linked field from the first identity service may also be identified with a linked field of a third identity service. As such, multiple disparate identity services may linked based on the linked fields and used to create a virtual identity.

Figure 5:
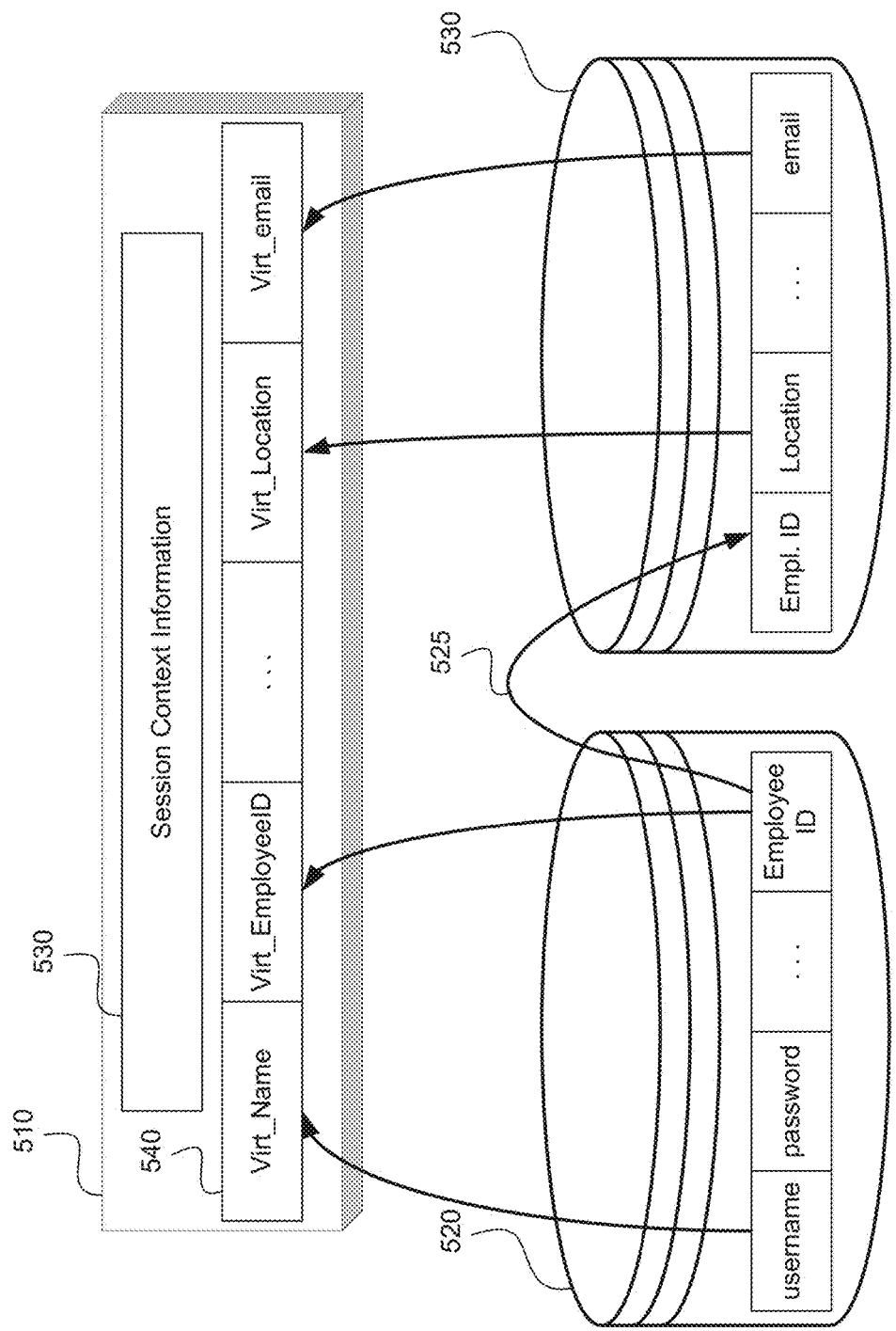
FIG. 5 is an illustration of an example virtual identity being populated by disparate identity services in accordance with some embodiments.

FIG. 5 is an illustration of an example virtual identity being populated by disparate identity services. In general, the identity services 520 and 530 may correspond to identity service 160, 170, and 180 of FIG. 1. Furthermore, the user session information 510 may correspond to session data 360 of FIG. 3. The virtual identity 540 may be created by a virtual identity and context module 220 or 300 of FIGS. 2 and 3 in an identity service broker.

As shown in FIG. 5, the virtual identity 540 may include multiple virtual attribute fields that are populated or filled by an identity service 520 and an identity service 530. As an example, the virtual identity 540 may include virtual attribute fields labeled or named 'Virt_Name,' 'Virt_EmployeeID', 'Virt_Location,' and 'Virt_email.' Although FIG. 5 illustrates four virtual attribute fields, any number of virtual attribute fields and different types of virtual attribute fields may be used. In some embodiments, the virtual identity 540 may provide an abstraction of the attribute fields stored at the identity services 520 and 530 to be used in policies and for transmitting to an application. For example, a policy may be created by specifying the virtual attribute fields as opposed to the different attribute fields stored at the identity services 520 and 530. As such, the virtual identity may be considered to include a set of normalized attribute fields (e.g., the virtual attribute fields) that may be used to define policies of the identity service broker. In some embodiments, the values of the virtual attribute fields may be a result of a transformation or aggregation function (e.g., substring, convert to integer, combine, etc.) rather than only a normalization of the values. For example, values from the attribute fields may be transformed or aggregated when the virtual attribute fields are populated.

Returning to FIG. 5, the user session information 510 may include session context information 530. In some embodiments, the session context information 530 may specify information associated with a user session at the time the user logged in to the SSO of the identity service broker. The session context information 530 may include, but is not limited to, a username of a user who has logged in to the identity service broker, an authentication type of the identity service that the user has authenticated against, a level of assurance associated with the user, a time and date of the user session, a device type used by the user, a device reputation, device Internet Protocol (IP) address, etc.

As shown, the virtual identity 540 may be populated by values from the attribute fields in the identity service 520 and the identity service 530. For example, in some embodiments, the identity service 520 may provide a primary authentication for a user as well as provide a source of supplemental attributes of the user. For example, the identity service 520 may include a record for each user including attribute fields such as 'username,' 'password,' and 'Employee ID.' In some embodiments, the user and the identity service 520 may be linked to the identity service 530. For example, the identity service 530 may provide a secondary authentication as part of a two factor authentication with the primary authentication provided by the identity service 520. The identity service 530 may also provide a source of supplemental attributes. For example, the identity service 530 may include a record for each user including attribute fields such as 'Empl. ID,' Location,' and 'email.' In some embodiments, an administrator of the identity service broker may preconfigure a link between attribute fields of the identity service 520 and the identity service 530. For example, the link 525 may represent such a preconfigured link between the attribute field 'Employee ID' at the identity service 520 and the attribute field 'Empl. ID' at the identity service 530. In some embodiments, the link 525 may be referred to as a federated identification (ID) as it is used to establish a relationship between the record in the identity service 520 with the record in the identity service 530. For example, the link 525 may be used to search the identity service 530 with a record that corresponds to a record in the identity service 520. In some embodiments, a record in the identity service 520 and a record in the identity service 530 with a common value in the linked attribute fields may be records associated with the same user. As such, the attribute fields of the records from the identity services may be used to populate or fill the virtual attribute fields of the virtual identity. For example, as shown, one or more attribute field values from the identity service 520 may be used to populate one or more virtual attribute fields and one or more attribute field values from a corresponding record of the identity service 530 may be used to populate one or more virtual attribute fields of the same virtual identity.

In some embodiments, the identity services may include, but are not limited to, Integrated Windows Authentication (WA) identity services, Public Key Infrastructure (PKI) identity services, Kerberos identity services, a token, Active Directory, a third party website credential (e.g., a username and password of another network), Lightweight Directory Access Protocol (LDAP), Security Assertion Markup Language (SAML), etc.

Although FIG. 5 illustrates a virtual identity for a single user being populated by two identity services, any number and any type of identity services may be used to populate multiple virtual identities of multiple users. Furthermore, the virtual identity may be used to cover multiple disparate identity services at the same time. For example, different user categories from different identity services may be covered or mapped by the virtual identity. As an example, a first identity service including attributes of employees from a corporate directory, a second identity service including attributes of customers or partners corresponding to a partner user directory, and a third identity service including attributes of visitors from an external and potentially public identity service may all be mapped to the virtual attribute fields of the virtual identity or multiple virtual identities of multiple users. In some embodiments, the administrator of the identity service broker may preconfigure the relationships between the virtual identity map to such disparate identity services and different categories therein. For example, the administrator of the identity service broker may indicate that the information corresponding to the employees from the corporate directory, the customers or partners from a partner user directory, and visitors from an external identity service may all be associated or mapped to particular virtual attribute fields.

As an example, a virtual identity of a first user may be populated based on attribute fields of a first identity service and a second identity service. A virtual identity of a second user may be based on attribute fields of the first identity service, a third identity service, and fourth identity service. Thus, the virtual identity may be a mapping between the first and second users and the various attribute fields of the first, second, third, and fourth identity services.

Figure 6:
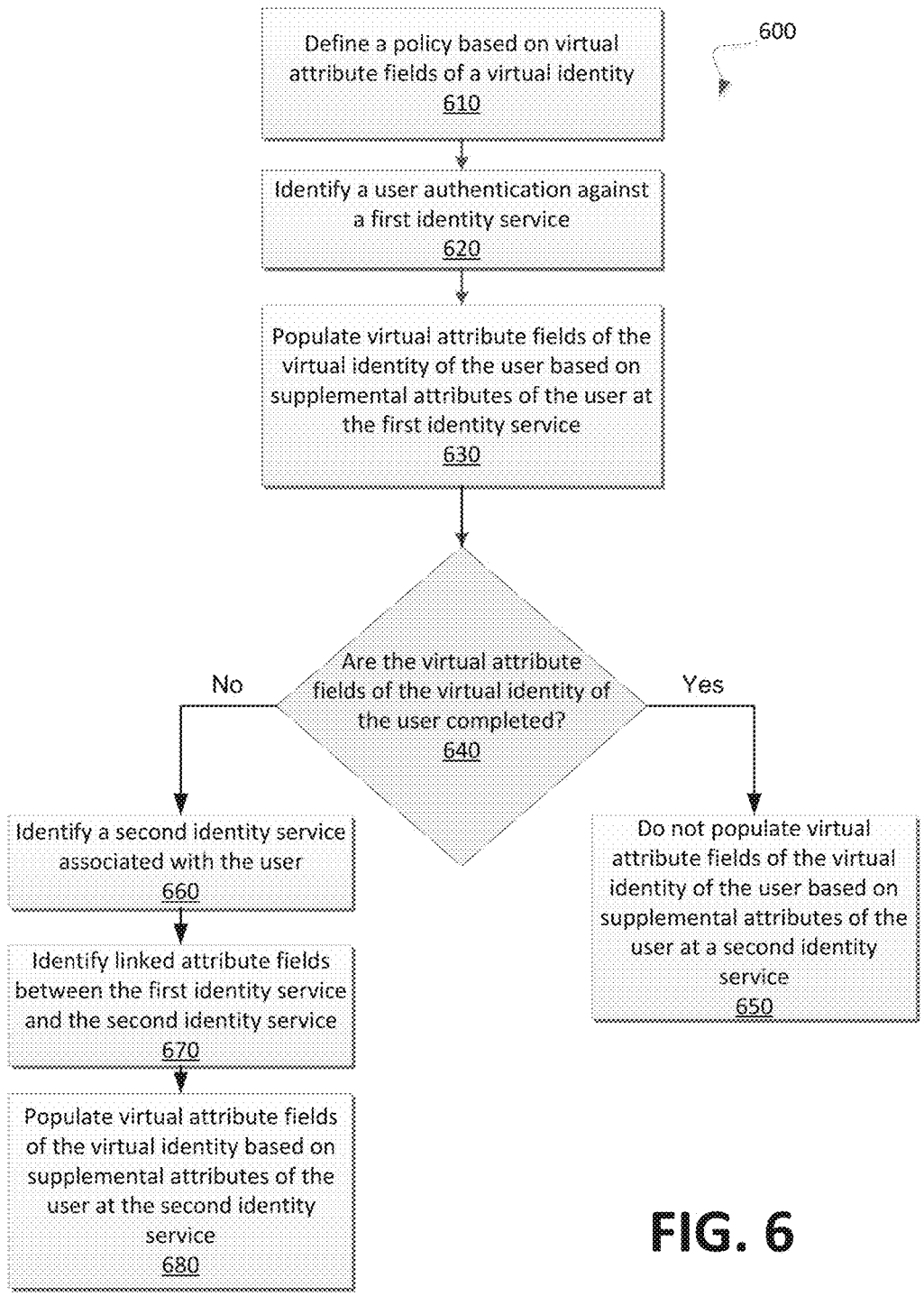
FIG. 6 is an example method to populate virtual attribute fields of a virtual identity based on one or more identity services in accordance with some embodiments of the present disclosure.

FIG. 6 is an example method 600 to populate virtual attribute fields of a virtual identity based on one or more identity services. The method 600 may be performed by processing logic that may comprise hardware (e.g., a processing device, circuitry, dedicated logic, programmable logic, microcode, etc.), software (e.g., instructions run on a processing device), or a combination thereof. In some embodiments, the method 600 may be performed by a virtual identity and context module 220 or 300 of FIGS. 2 and 3 in an identity service broker 150 or 200.

As shown in FIG. 6, the method 600 may begin by the processing logic defining a policy based on virtual attribute fields of a virtual identity (block 610). For example, the processing logic may generate a policy to include conditions based on one or more supplemental attributes of a user that correspond to the virtual attribute fields of a virtual identity of the user. The processing logic may further identify a user authentication against a first identity service (block 620). For example, the user authentication may be a primary authentication. Furthermore, the processing logic may populate or fill virtual attribute fields of the virtual identity of the user based on supplemental attributes of the user stored in attribute fields of the first identity service (block 630). For example, the processing logic may identify user attributes (e.g., supplemental attributes) stored at the first identity service that correspond to virtual attribute fields of the virtual identity. In some embodiments, an administrator of the identity service broker may preconfigure relationships or correspondence between the user attributes stored at the first identity service and the virtual attribute fields of the virtual identity. The processing logic may further determine if the virtual attribute fields of the virtual identity of the user are completed (block 640). If the virtual attribute fields are completed (e.g., all of the virtual attribute fields have an attribute value from the first identity service), then no further virtual attribute fields are populated based on user supplemental attributes at a second identity service (block 650). However, if it is determined that at least one of the virtual attribute fields of the virtual identity of the user are not completed, then a second identity service associated with the user may be identified (block 660). In some embodiments, an administrator of the identity service broker may preconfigure or select a link between the first identity service and the second identity service. The processing logic may further identify a linked attribute field between the first identity service and the second identity service (block 670). In some embodiments, an administrator of the identity service broker may preconfigure the selection of the linked attribute fields between the first identity service and the second identity service. Furthermore, the processing logic may populate virtual attribute fields of the virtual identity based on the user supplemental attributes stored at the second identity service. For example, a record including multiple user attributes stored at the second identity service may be identified based on common attribute values of the linked attribute fields.

Figure 7:
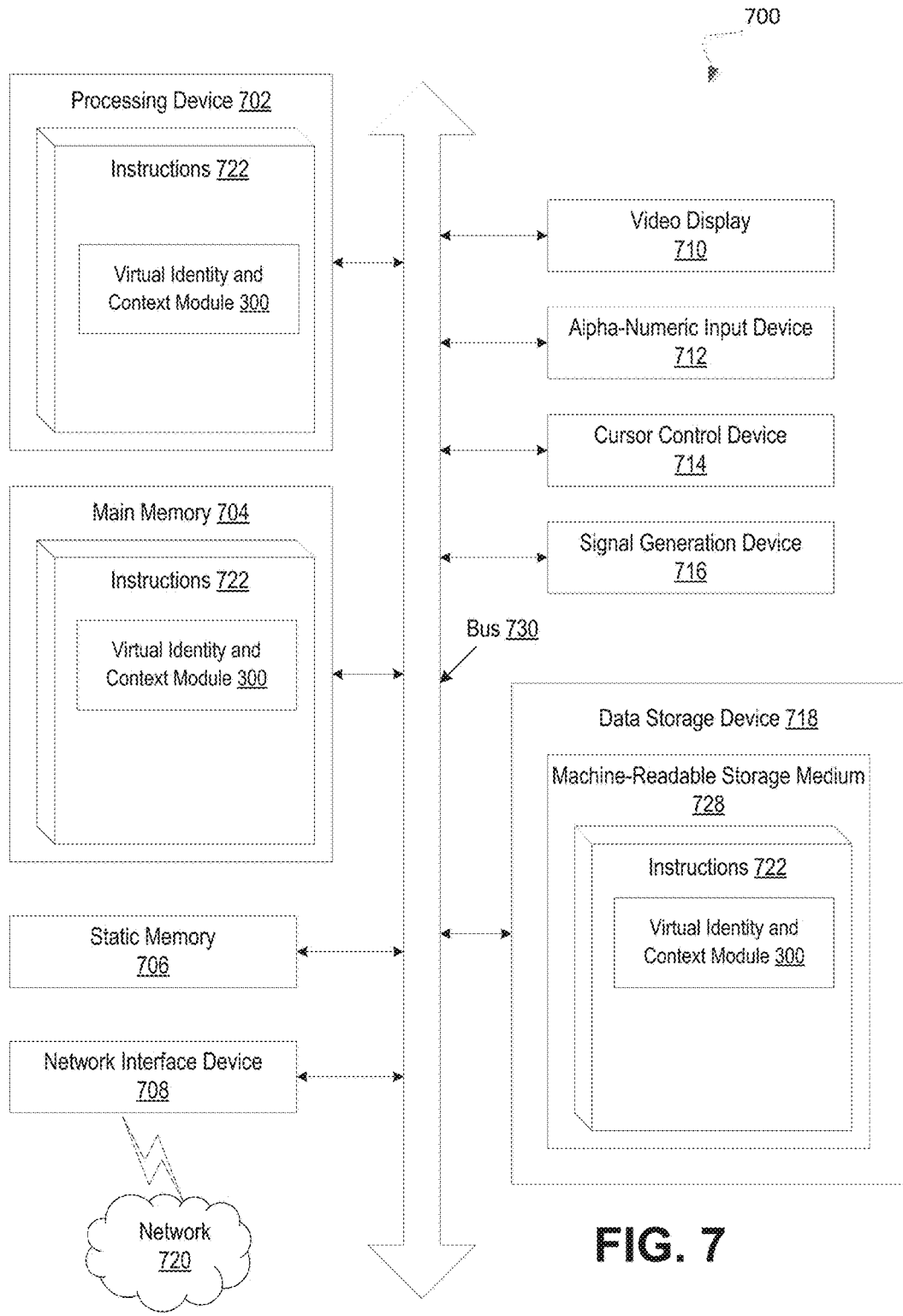
FIG. 7 is a block diagram of an example computer system that may perform one or more of the operations described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a virtual identity and context module (e.g., virtual identity and context module 220 of FIG. 2 or virtual identity and context module 300 of FIG. 3) and/or a software library containing methods that call modules or sub-modules in a virtual identity and context module. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A computer-implemented method comprising:
   identifying, by an identity service broker implemented by at least one computer processor, an authentication of a user provided by a first identity service;
   generating, by the identity service broker, a virtual identity of the user comprising a plurality of virtual attribute fields;
   populating, by the identity service broker, a first virtual attribute field of the plurality of virtual attribute fields based on a value of a first attribute associated with the user and recorded by the first identity service;
   determining, by the identity service broker after the populating of the first virtual attribute field, that a second virtual attribute field of the plurality of virtual attribute fields is not assigned a value;
   identifying, by the identity service broker, a second identity service associated with the user when it is determined that the second virtual attribute field is not assigned a value, the second identity service configured to provide attributes of the user but not configured to provide authentication of the user, wherein the second identity service is identified based on identifying a link between an attribute of the second identity service and the first attribute of the first identity service;
   populating, by the identity service broker, the second virtual attribute field of the plurality of the virtual attribute fields with a value of a second attribute recorded by the second identity service, wherein the second attribute is not the linked attribute of the second identity service and is not recorded by the first identity service; and allowing, by the identity service broker, access for the user to a software application or a network application that is managed by the identity service broker based on the value of the populated second virtual attribute field of the virtual identity of the user satisfying a condition of a policy associated with the populated second virtual attribute field, the allowing of access being enabled by the link, which comprises a federated identity of the user, between the previously-unlinked second identity service and first identity service.

2. The method of claim 1, further comprising:
defining the policy based on values of the plurality of virtual attribute fields of the virtual identity.

3. The method of claim 1, wherein the authentication is a primary authentication performed against the first identity service, and the second identity service is a supplemental attribute service that is not capable of providing a primary authentication of the user.

4. The method of claim 1, further comprising:
transmitting a value of at least one of the virtual attribute fields of the plurality of virtual attribute fields to the software application or the network application accessed by the user.

5. An identity service broker system comprising:
a memory; and
at least one computer processor coupled with the memory configured to:
identify an authentication of a user provided by a first identity service;
generate a virtual identity of the user comprising a plurality of virtual attribute fields; populate a first virtual attribute field of the plurality of virtual attribute fields based on a value of a first attribute associated with the user and recorded by the first identity service;
determine, after populating the first virtual attribute field, that a second virtual attribute field of the plurality of virtual attribute fields is not assigned a value;
identify a second identity service associated with the user when it is determined that the second virtual attribute field is not assigned a value, the second identity service configured to provide attributes of the user but not configured to provide authentication of the user, wherein the second identity service is identified based on identifying a link between an attribute of the second identity service and the first attribute of the first identity service;
populate the second virtual attribute field of the plurality of virtual attribute fields with a value of a second attribute recorded by the second identity service, wherein the second attribute is not the linked attribute of the second identity service and is not recorded by the first identity service; and
allow access for the user to a software application or a network application that is managed by the identity service broker based on the value of the populated second virtual attribute field of the virtual identity of the user satisfying a condition of a policy associated with the populated second virtual attribute field, the allowing of access being enabled by the link, which comprises a federated identity of the user, between the previously-unlinked second identity service and first identity service.

6. The identity service broker system of claim 5, the at least one computer processor is further configured to:
define the policy based on values of the plurality of virtual attribute fields of the virtual identity.

7. The identity service broker system of claim 5, wherein the authentication is a primary authentication performed against the first identity service, and the second identity service is a supplemental attribute service that is not capable of providing a primary authentication of the user.

8. The identity service broker system of claim 5, the at least one computer processor is further configured to:
transmit a value of at least one of the virtual attribute fields of the plurality of virtual attribute fields to the software application or the network application accessed by the user.

9. A non-transitory computer readable storage medium including instructions that, when executed by at least one computer processor, cause the at least one computer processor to perform operations of an identity service broker, the operations comprising:
identifying an authentication of a user provided by a first identity service;
generating a virtual identity of the user comprising a plurality of virtual attribute fields;
populating a first virtual attribute field of the plurality of virtual attribute fields based on a value of a first attribute associated with the user and recorded by the first identity service;
determining, after the populating of the first virtual attribute field, that a second virtual attribute field of the plurality of virtual attribute fields is not assigned a value;
identifying a second identity service associated with the user when it is determined that the second virtual attribute field is not assigned a value, the second identity service configured to provide attributes of the user but not configured to provide authentication of the user, wherein the second identity service is identified based on identifying a link between an attribute of the second identity service and the first attribute of the first identity service;
populating the second virtual attribute field of the plurality of the virtual attribute fields with a value of a second attribute recorded by the second identity service, wherein the second attribute is not the linked attribute of the second identity service and is not recorded by the first identity service; and
allowing access for the user to a software application or a network application that is managed by the identity service broker based on the value of the populated second virtual attribute field of the virtual identity of the user satisfying a condition of a policy associated with the populated second virtual attribute field, the allowing of access being enabled by the link, which comprises a federated identity of the user, between the previously-unlinked second identity service and first identity service.

10. The non-transitory computer readable storage medium of claim 9, the operations further comprising:
defining the policy based on values of the plurality of virtual attribute fields of the virtual identity.

11. The non-transitory computer readable storage medium of claim 9, wherein the authentication is a primary authentication performed against the first identity service, and the second identity service is a supplemental attribute service that is not capable of providing a primary authentication of the user.

\* \* \* \* \*